F. BUTLER.
LIFTING DEVICE.
APPLICATION FILED SEPT. 9, 1915.
1,191,660.
Patented July 18, 1916.
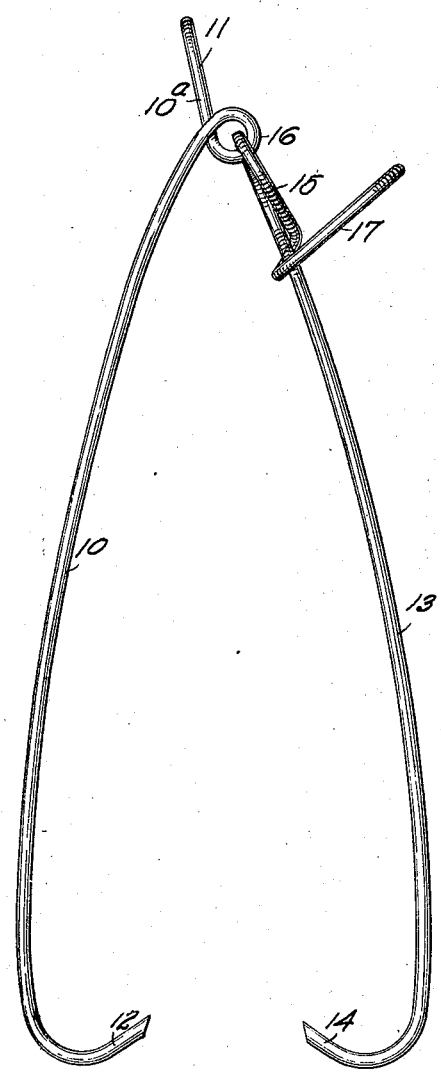
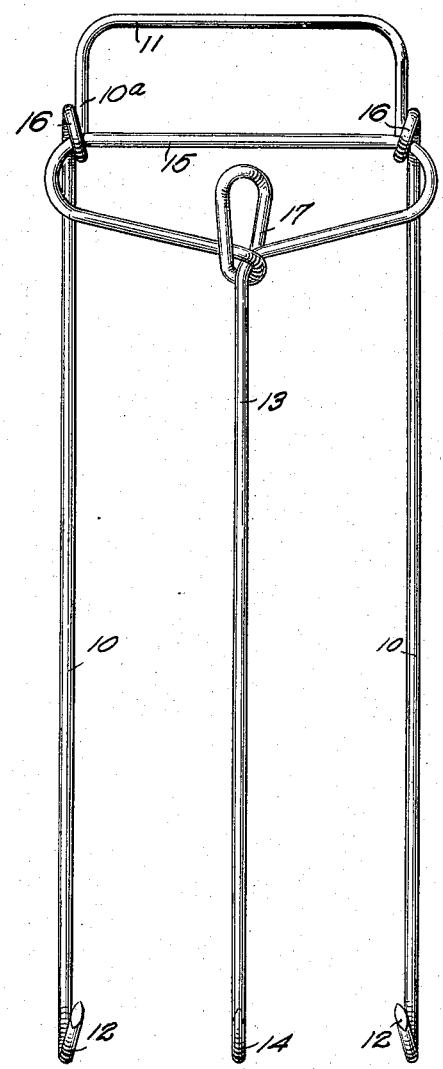
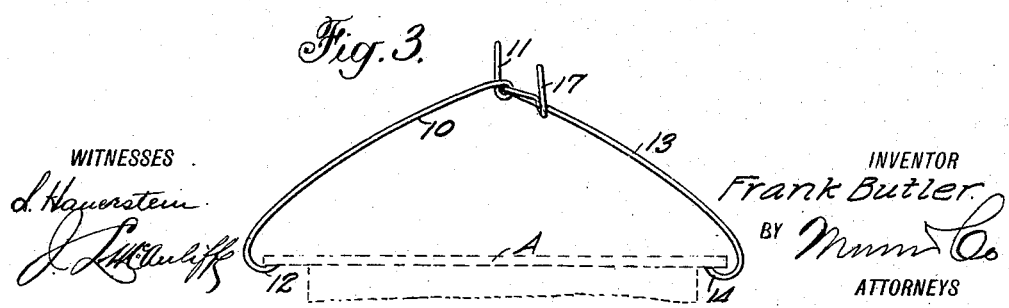
WITNESSES
INVENTOR
Frank Butler.
BY
ATTORNEYS

UNITED STATES PATENT OFFICE.

FRANK BUTLER, OF OXNARD, CALIFORNIA.

LIFTING DEVICE.

1,191,660.  Specification of Letters Patent.  Patented July 18, 1916.

Application filed September 9, 1915. Serial No. 49,765.

*To all whom it may concern:*

Be it known that I, FRANK BUTLER, a citizen of the United States, and a resident of Oxnard, in the county of Ventura and State of California, have invented a new and Improved Lifting Device, of which the following is a full, clear, and exact description.

My invention relates to a device for lifting pans, plates, and other utensils and articles in camp, lifting filled milk pans or heavy articles such as a nail keg. The lifting and carrying of filled milk pans, for instance, requires the greatest steadiness to prevent the spilling of the milk. In my device members are provided so arranged as to properly balance the load, there being a pair of hook members at one side and an opposed single member, and I provide on the member having the pair of hooks, a handle, and on the single hook member, a lever, being so formed and arranged that the device may be manipulated with the digits of one hand for engaging and disengaging the hook members for the article to be lifted and for so disposing the hook members on the article to be lifted that the article may be carried perfectly level and with great steadiness. At the same time the elements are embodied in a device of simple, cheap and strong construction, which will be more particularly explained in the specific description following.

Reference is to be had to the accompanying drawings forming a part of this specification in which similar reference characters indicate corresponding parts in all the views.

Figure 1 is a side elevation of a lifting device embodying my invention; Fig. 2 is a front elevation; and Fig. 3 is a side elevation on a smaller scale indicating the manner of using the device.

In constructing a practical embodiment of the invention, a U-shaped member is provided, comprising elongated shanks 10, spaced apart and these are joined by an integral cross bar 11, at the top, said cross bar constituting a handle. At the lower ends the shanks 10, are formed with hooks 12. A second member 13 is provided, which presents a single shank, which is disposed opposite to and approximately equidistant from the shanks 10. The lower end of the shank 13, terminates in a hook 14, disposed oppositely to the hooks 12. At the upper end of the single shank 13, the same is formed with a transverse loop extending at opposite sides of the said shank and presenting a cross bar 15. A pivotal connection between the loop of the single shank and the pair of shanks is affected by forming hinge eyes 16, on the shanks 10, below the cross bar 11, said eyes 16, embracing the cross bar 15 of the single shank near the ends of said cross bar.

The described construction permits of the single shank being swung toward or from the pair of shanks. In order to facilitate the relative movements of the respective shanks, I form a lever member 17, on the single shank at its juncture with the loop thereof, for which purpose the wire from which the shank 13, is formed, is bent to form the loop with its cross bar 15, and the free end is bent outwardly and returned on itself to form the lever 17 in the form of a loop. The lever 17 is disposed in an outward direction at an angle to the shank 13. The upper portions 10ª, of the shanks 10, between the handle bar 11, and the hinge eyes 16, are disposed at an inclination to the remainder of the shanks 10.

In use, the handle 11 is grasped with the fingers of one hand and the thumb of the same hand is engaged with the lever 17, to swing the hooks apart sufficiently to grasp a pan or other article conventionally indicated at A in Fig. 3. With the lifting device engaged with the article to be lifted, the portions 10ª, of the shanks 10, and the lever 17, will be disposed approximately vertical and the handle will be positioned above the center of the load, the lever and the handle being always in convenient position for their ready manipulation by the digits of the one hand.

Having thus described my invention, I claim as new and desire to secure by Letters Patent:

The herein described lifting device formed of two members, one member being U-shaped and including a pair of spaced shanks, joined at the top by an integral bar constituting a handle and the shanks terminating at the lower ends in gripping hooks, the other member presenting a single shank, disposed opposite to and approximately equidistant from the pair of shanks, said single shank terminating at its lower end in a hook disposed oppositely to the hooks of the pair of shanks, the said single shank having an integral transverse loop extending in opposite directions from said shank, the shanks of the pair being bent to form hinge eyes embracing the said loop near its ends below the said handle, and there being at the juncture of the loop and single shank, an outwardly projecting lever member integral with said shank and loop and positioned relative to the handle for both to be engaged by the digits of one hand.

In testimony whereof I have signed my name to this specification in the presence of two subscribing witnesses.

FRANK BUTLER.

Witnesses:
 FRANK WASSERMAN,
 H. P. SPEER.